United States Patent [19]
White

[11] Patent Number: 6,002,669
[45] Date of Patent: Dec. 14, 1999

[54] EFFICIENT, MULTI-PURPOSE NETWORK DATA COMMUNICATIONS PROTOCOL

[76] Inventor: Darryl C. White, 3925 Willowmeade Dr., Snellville, Ga. 30278

[21] Appl. No.: 08/823,492

[22] Filed: Mar. 25, 1997

[51] Int. Cl.[6] .................................................. H04L 12/28
[52] U.S. Cl. .......................... 370/235; 370/400; 370/447; 370/462
[58] Field of Search ..................... 370/443, 444, 370/447, 448, 461, 462, 230, 231, 235, 389, 394, 503, 509, 514, 400

[56] References Cited

U.S. PATENT DOCUMENTS

4,922,486  5/1990  Lidinsky et al. ..................... 370/427
5,381,413  1/1995  Tobagi et al. ....................... 370/448

*Primary Examiner*—Alpus H. Hsu
*Attorney, Agent, or Firm*—Charles L. Warner; Smith, Gambrell & Russell, LLP

[57] ABSTRACT

An improved communication protocol for networks of devices employing a plurality of nodes which communicate using message packets over private or shared access media. Network message packets support efficient and reliable transmission of data from simple sensor or control devices and complex devices requiring kilobyte or larger file data transfers. In implementations where a plurality of nodes share a common network media, the system regulates the access to the network based on the priority and type of the device and reduces mutually destructive collisions.

15 Claims, 3 Drawing Sheets

| 10A | 12 | 14 | 16 | 10B |

FIG. 1

| 20 | 22 | 24 | 26 | 28 | 30 | 32 |

EFFICIENT, MULTI-PURPOSE NETWORK DATA COMMUNICATIONS PROTOCOL

BACKGROUND—FIELD OF THE INVENTION

The present invention generally relates to data communication networks, and more specifically to a scaleable protocol which enables the transmission of data packets between nodes of varying complexity and cost.

BACKGROUND—PRIOR ART

Various network communication protocols are known in the art of data communications which facilitate the transmission and reception of data by the nodes which comprise the network. A number of specific "standard" protocols exist for transmission of data between specific types of nodes with specific capabilities required for each node. Existing prior art has well addressed the needs of networks comprised of substantially similar devices with similar data communication speeds. Computer communication protocols, for example Local Area Network protocols such as Ethernet, Apple-Talk, X-25, and IBM's Systems Network Architecture (SNA), require communication between devices of similar complexity, and communication speed. Even if such devices are peripherals to a more complex system, i.e. a network server or hosting computer versus a printer connected to it, each of the node devices must support similar circuitry to be able to interface to the network medium and be understood on the network. A 10 MB/s Ethernet network still not support direct connection to a slower device. instead, a network interface card is required with the intelligence to buffer the data to and from the network. The network interface card itself requires specific additional hardware interface circuitry, again increasing the required cost and complexity of the system to communicate on the network.

Other protocols, such as the Internet Protocol, establish the basic format of a packet without specifying any of the low-level network implementation requirements. In essence, the Internet Protocol provides only the Network Layer of the OSI protocol model. Other compatible application protocols, such as the Transmission Control Protocol (TCP), File Transfer Protocol (FTP), and Hyper-Text Transport Protocol (HTTP), provide the Transport and Session layers of the OSI model. These systems, however, do not define the implementation details required to transmit and receive the data over any specific network medium. While this prior art method offers the benefit of allowing the user to transmit and receive Internet-compatible data packets over various types of network implementations, the Data Link Layer and Physical Layer remain dependent on the users choice of network media. Additional network hardware is required to buffer the data and enforce conformity of the communication data rates and formats on all devices on a channel. The Internet Protocol stacks provide no capability for intermingling lower speed devices with higher speed devices on the same channel. While generally effective for transmission of data packets of at least moderate length (i.e., several thousand bytes), it presents a significant disadvantage to systems requiring communication with sensory and control devices with limited intelligence and processing resources. A minimum compatibility of the node device hardware is also required for each supported network media channel, which forces the lowest-common cost on all nodes of the system to be substantially higher and precludes effective scaling of the network to simpler functions such as home and building automation.

An attempt to answer this need resulted in the "LonTalk Protocol" described in part in U.S. Pat. Nos. 5,018,138 by William B. Twitty, et al., and 5,319,641 by Marek J. Fridrich, et al. This invention typifies the current state of the art with respect to communication protocols with multimode capabilities. The LonTalk Protocol, as described in the aforementioned patent applications, and in further detail in the publication by Echelon Corporation, "LonTalk Protocol Specification, Version 3.0", describes a system for communicating short blocks of data among sensor and control nodes over various network media. However, while the implementation described provides for an arguably lower cost implementation than prior art systems, it does not provide sufficient flexibility and scalability for all applications. The minimum estimated cost for implementing a simple but complete LonTalk-compatible device node, such as a switch-input sensing device, is $30 in quantities of 10,000 pieces. While this cost may be negligible in some applications, it is excessively high for consumer data communication and home automation devices. The high cost of products which support the LonTalk protocol have resulted in the largest segment of the consumer market for home automation equipment implementing simpler prior art control and sensory network protocols with much lower performance, such as the X-10 protocol.

Another deficiency in the Lontalk Protocol is the "p-persistent Carrier Sense Multiple Access" method of Media Access Control (MAC) lacks sufficient packet priority-level negotiation and creates a non-deterministic delay for access to the channel by nodes. The methodology of this protocol multiplies an estimate of the current channel backlog by a randomized delay window. One negative consequence of this method of access negotiation occurs when the "backlog" estimate is not matched accurately with the "real" message backlog, resulting in reduced channel capacity. In fact, this matching will rarely be accurate due to the limitations of the system, and this impact is further enforced by the tendency of the protocol algorithms to overestimate the backlog (LonTalk Protocol Specification, page 110, Section 12.5. Copyright 1994, Echelon Corp.). A further drawback to this present art is the method of packet priority negotiation. If the channel is idle for longer than the delay specified in the p-persistent CSMA algorithm, multiple devices may simultaneously access the channel without priority negotiation, thus collisions will occur which impact the system throughput.

The present art in communication protocols also use overly complex packet messaging formats, which impacts both the cost of the network device design effort and the device hardware and software costs. For example, the Lon-Talk protocol requires devices understand five differing packet address formats and a myriad of complex packet types. This significantly increases the cost and complexity of the network device and of the effort to develop new application devices for LonTalk networks and ensure compatibility with other LonTalk devices.

Yet another deficiency of the present art in communication protocols is the lack of support for network devices with varying data payload requirements. Present sensory and control protocol implementations, such as LonTalk, CE-bus, and DeviceNet, typically only support means for transmitting short message packets, and are inefficient for large block transfers. Packets normally are limited to less than 256-byte data payloads. Conversely, for protocols that support large data transfers, such as FTP, Xmodem, and Kermit file transfer protocols, the packet overhead is inefficient for use with short message packets. Other alternative protocols with minimal overhead, such as the User Datagram Protocol of the Internet Protocol stack (UDP/IP), do not provide reliable packet communication and acknowledgment structures.

It is evident that a need exists for an efficient packet data protocol which supports both low-cost sensory and control applications as well as longer file-type data transactions, and that the present state of the art provides systems which provide one or the other. Further, it is evident that such a system needs to provide concise message packets with flexibility to allow relatively simple devices and more complex devices to operate and exchange data on the same network channel, while providing scaleable levels of application service features.

OBJECTS AND ADVANTAGES

Accordingly, several objects and advantages of my invention are a scaleable protocol which provides efficient messaging for low-cost applications and can be effectively implemented with simple application functionality in economical micro-controllers costing under $1. The present invention also provides essential capabilities to support communication among highly-sophisticated nodes and application devices.

Another objective of the present invention is to provide means for efficiently transferring data between applications with varying data payloads via a consistent reliable, and easily implemented transport structure.

A third objective of the present invention is to provide an improved system for Media Access Control priority resolution and collision avoidance with minimal impact on packet throughput. This invention supports the distinction between a public or shared channel and a private channel, and maximizes the efficiency of the transmission in either environment.

A fourth objective of the present invention is to describe a network system which provides automatic node identification and service status announcements, to simplify the configuration and installation of the aforementioned network system. This system also provides the capability to reconfigure any node or device operating on the network via data transmitted through the network, including the transmission of new operating code for devices designed accordingly.

A fifth objective and advantage of the present invention is that it provides a media-independent communication framework, with provisions for all seven of the OSI protocol layers supported. The protocol provides transparent operation to the application over wired links, radio links, or any communication media the user chooses to implement, enabling the construction of low-cost network routers and gateways between media types.

Other objects and advantages of the present invention are that it provides for networked systems which support application-assigned group messaging with and without node acknowledgments, simple subnet broadcasting, and packet instance or copy management. Further objects and advantages of this invention will become apparent to one skilled in the art from a consideration of the ensuing description.

SUMMARY OF THE INVENTION

The CyberNet Protocol is designed for inter-node communication in a hierarchical or peer-to-peer network of data, sensor, or control devices. The primary criteria of the protocol are scalability, communications reliability, and flexibility in accommodating a wide array of devices over varied channel media.

The CyberNet Protocol is a structured messaging format designed to allow various industrial or residential control and sensor devices to communicate in a common language independent of the hardware implementation. It provides the reliability and error detection features of packet acknowledgment and 16-bit packet CRC's, while minimizing the processing and communications overhead required of simple devices The protocol supports two types of connections, a Public Channel and a Private Channel. A Public Channel is where multiple devices are interconnected over a common communications link (typically TDM), including radio, infrared, power-line carrier, and wired networks. A Private Channel is a direct communications link between two devices over a full-duplex channel, such as a modem-linked telephone connection or RS-232 link.

DETAILED DESCRIPTION—PREFERRED EMBODIMENT

Figure 4:
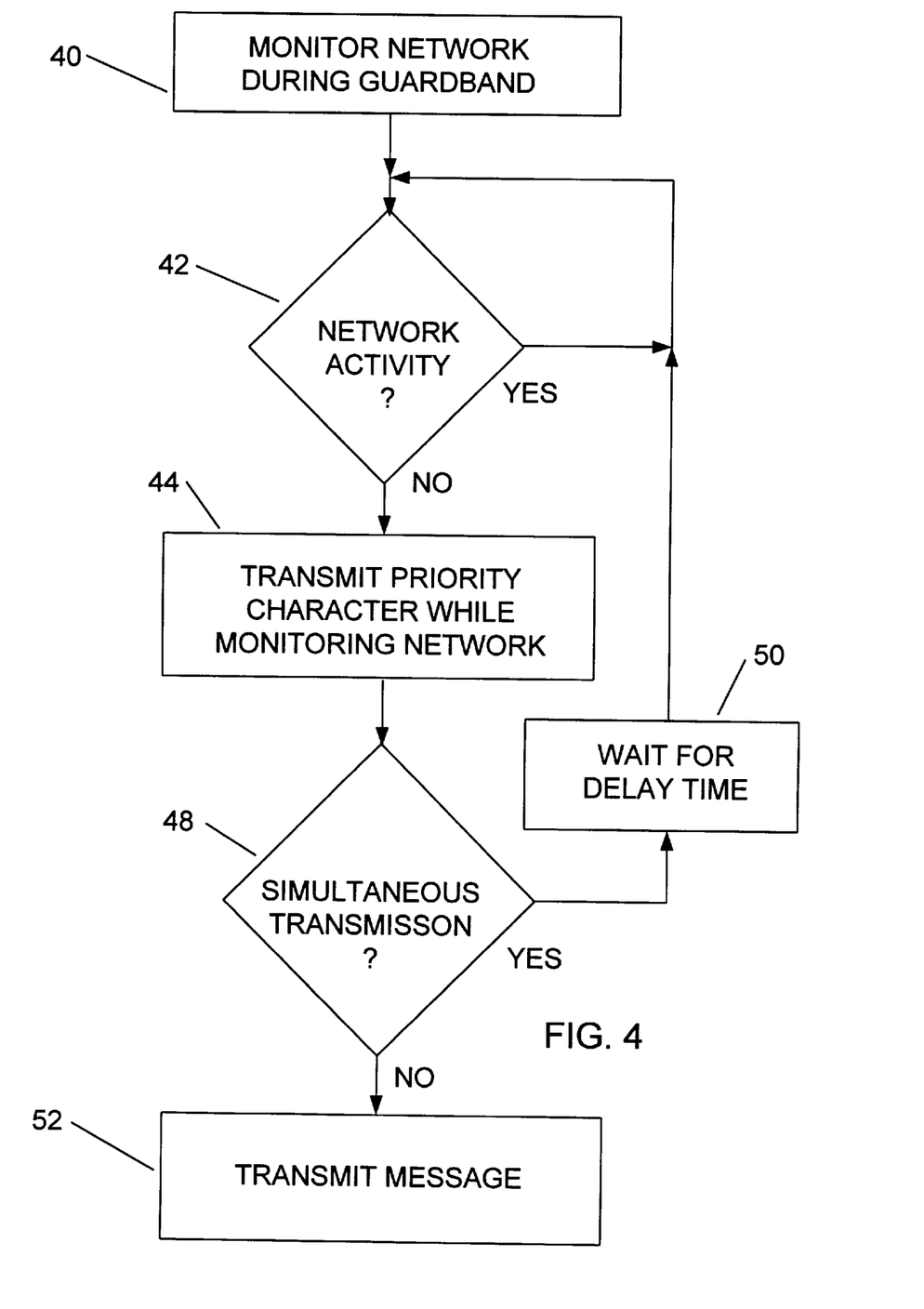
FIG. 4 is an illustration of the procedure for resolving simultaneous attempts to transmit.

The CyberNet system specification is intended to be independent of the physical communications medium it is built upon. Network data is communicated asynchronously, but the data rate(s) and modulation methods are selected by the designer for the application. Thus there are no signal timing absolutes, however, it is recommended that network devices operate at standard baud rates of 300, 1200, 2400, 9600, 19200, etc., where possible. No maximum baud rate is specified. All data is transmitted as 10 bit characters: with one start bit, eight data bits, no parity, and one stop bit. The nodes communicate on a shared or publicly accessible channel, and which operate such that access to the channel by each node is controlled as follows and as shown in FIG. 4: (a) each node which needs to transmit a message precedes the transmission of the packet by monitoring 40 the status of the channel for activity 42 for a period of time whose value corresponds to a multiple of the access speed of the slowest device on the network and the type of device desiring to transmit; (b) each node, when attempting to transmit, and after waiting the above-mentioned guardband time, then transmits 44 a priority character at a data rate corresponding to the slowest device on the network and monitors the network signal lines for simultaneous access by another node or other nodes; (c) each node, upon detection 48 of network contention by a device of higher priority, aborts its transmission and delays 50 for a period of time determined by the minimum device data rate, its assigned priority level, and the number of aborted attempts since the previous successful transmission or detected network idle condition; (d) each node, after establishing its access to the network, may optionally be enabled to transmit a data pattern which is utilized by the receiving node or nodes to synchronize to the data rate of the device; and (e) all nodes wait the period of time specified in (a) above after any activity on the network prior to attempting to access the network. These actions are further discussed below.

Device Configuration Data

Each device on the network must provide nonvolatile memory for the storage of its network configuration and application information. When a device is installed in a network, it is assigned a network or node ID that is unique for that network domain. The network device ID (a.k.a., Node ID or Source ID) normally provides information as to the network hierarchy of the device. The network compatibility data is stored in certain predefined data map locations in all system devices (refer to the device data map specifications). The system is intended to be self-configuring upon installation of a supported device (plug-and-play), to the extent that the device provides the user application with all the pertinent information required to communicate with it.

System Compatibility Requirements

The CyberNet protocol is designed to offer flexibility in the transactions that can occur on the network, and scalability, with devices supporting only the level of functionality needed to accomplish their intended purpose. For the system to function properly, nodes must be able to understand the messages sent by other nodes, and thus all devices must implement a minimum level of the protocol.

Public Channel Packet Framing

For Public Channels, access to the communications channel must be arbitrated among the devices to ensure coherent data transfers and minimize collisions and retransmissions. On Public Channel systems, CyberNet message data packets are enclosed in a Media Access Control (MAC) "envelope" that protects and identifies the packet. This "envelope" includes Carrier-Sense Multiple Access (CSMA) controls, with bus idle time constraints, priority negotiation, and data timing synchronization.

Figure 1:
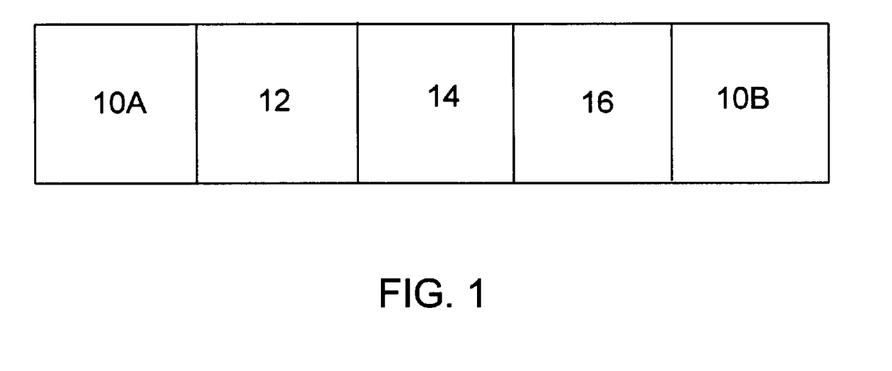
FIG. 1 is an illustration of the Media Access Control (MAC) packet envelope.

The MAC packet envelope, which encases the message packet, consists of the following: bus idle guardband 10A, priority character 12, sync character 14, message packet 16, and bus idle guardband 10B, as shown in FIG. 1.

Bus-Idle Guardband

FIG. 4 is an illustration of the procedure for resolving simultaneous attempts to transmit. The Bus-Idle Guardband is a period of no bus activity for 2 to 4 character-times at the minimum network baud rate. This is a constraint that devices must detect the network- bus in an idle or quiet state 40, 42 for a minimum number of character times at the lowest network- baud rate. The range of minimum idle characters is dependent on the priority assigned to a device, ranging from 2 to 4. Network master stations normally wait three idle times before accessing the bus, and simple nodes should normally wait four character times. However, for alarm or priority messages, devices may reduce their wait time by one character time. For example, a simple node operating on a network with the minimum baud rate set to 300 baud, must detect the bus idle condition for 4×33.3 mS, or 133 mS. For urgent messages, such as alarm conditions, the node could drive the bus after 3×33.3 mS or 100 mS. The bus master would begin at three cycles and decrease it to two for urgent messages.

Figure 5:
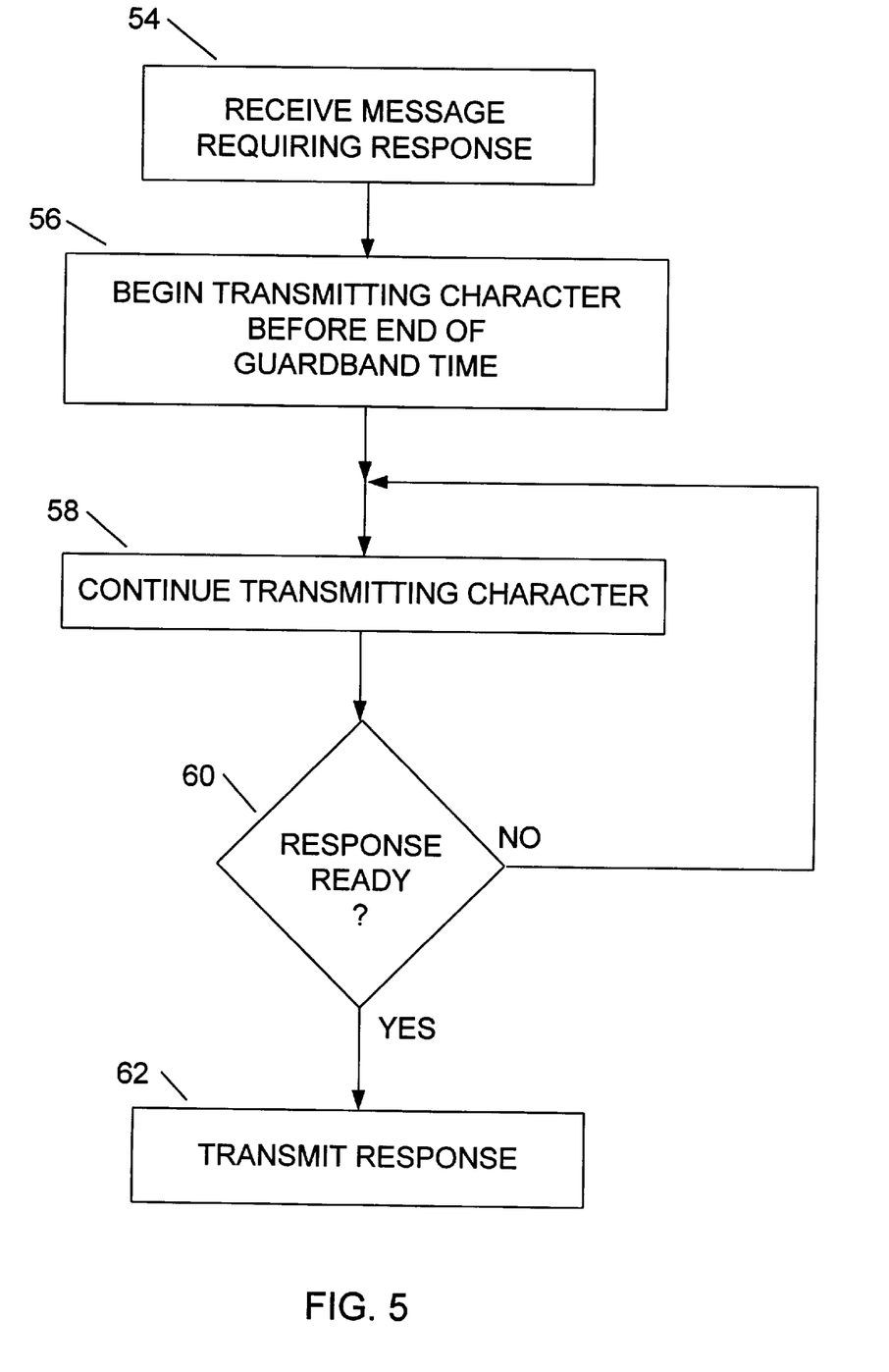
FIG. 5 is an illustration of the procedure for seizing the network.

FIG. 5 is an illustration of the procedure for seizing the network.

After the terminating character of the Message Packet is transmitted, the transmitting device must release the bus for the same guardband time before it can again attempt to access the network. However, an exception to this rule is allowed for Master Stations: a Master Station, upon receiving 54 a packet that requires a response, may seize the bus immediately after the packet is completed, by sending 56, 58 continuous break (negative bits) characters, until ready to send a packet 60. The Master Station must seize the bus within the minimum guardband timing 56 for any network device. This allows a Master Station to regulate the packet communications to complete a transaction before any other messages are accepted.

Priority Character

The Priority field contains a single character transmitted at the minimum network baud rate. Once a device determines the bus is available to it, it transmits 44 a single byte, at the lowest established network baud rate, that represents its preprogrammed priority level, or the least-significant eight bits of its Unit ID. The highest priority level is indicated by a value of zero, and the lowest is 255. When the physical network permits, transmitting devices should monitor 44 for competing carriers during the one-bits of the Priority Character. If a competing device is detected 48, the lower priority device must abort the transmission and relinquish the network to the higher priority device. After an aborted transmission, the device must restart the process of detecting if the bus is idle after a backoff delay. The backoff delay 50 is calculated by waiting at least one bit-time (at the minimum network baud rate) multiplied by the value of the Priority Character, less the number of aborted attempts since the last successful transmission. Thus if the minimum network baud rate is 1200 baud, and a device is assigned a Priority of $30 (or if no Priority is assigned, and that is the LSB of its ID), and the unit has made three aborted attempts, the backoff delay will be: 833 uS * (48–3), or 37.5 mS. If there is no competing carrier then the message may be transmitted 52.

Sync Characters

Synchronization: 2-to-4 characters (data=0AAH), transmitted at the device's normal baud rate. The Sync characters provide the means for automatic baud rate detection. The receiving units may use the timing of this byte to set the baud rate at which to receive the packet. This is not a requirement of the receiver, since it is permissible for CyberNet devices to only communicate at a preset baud rate, and to ignore messages sent at differing baud rates. To accommodate network devices operating at differing baud rates, the Sync Characters allow Master Stations, or other nodes, to detect the bit timing and reset their communications data rate. It is not required of nodes to support auto-baud synchronization, since they may operate on a fixed data rate. However, Master Stations must accommodate the data rates of all nodes in their sub-domain.

Message Packet

Figure 2:
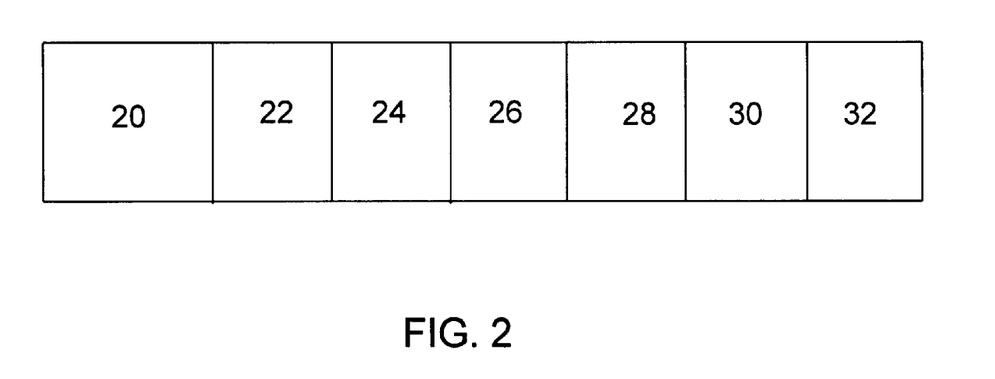
FIG. 2 is an illustration of the Message Packet.

The Message Packet provides the standard format for all communications of data between CyberNet devices. The basic Message Packet may not include the Data Fields, if the message is simply to notify another node of a communications condition. Examples of such conditions are an In-Service message or the response to a message from the receiving device. The Data Packet describes the message packet when the Data fields are included and it is used for all transfers of data between devices on the network. The structure of the Message Packet is shown below and includes the following fields: Packet Address 20, Message ID (MSG ID) 22, Response Code (RESP) 24, Data ID 26, Data 28, Packet CRC (PKT CRC) 30, and End-of-Packet (EOP) 32, as shown in FIG. 2.

The Packet Address fields contain the Destination Node(s) Address (4 bytes), the Group Address (1 byte), the Source Node Address (4 bytes), and a 16-bit CRC of the data in the three fields.

The Message ID field (MSG ID) is a single byte which describes the type of message being transmitted and how many times it has been repeated.

The Response Code field (RESP) is a single byte which contains the sender's desired reply conditions (i.e., the "RSVP" criteria of the message), and on replies contains a code signifying an Acknowledgment, Negative Acknowledgment, or other response to the original message.

The Data ID field (DATA ID) contains a 16-bit data pointer used to identify the "name" of the data being transferred. This field is not included if the Message ID indicates the message does not contain data.

The Data fields are only included if the Message ID indicates the message contains additional data, and contains two sub-fields: the Data Length (1 byte), and the Data field (1 to 256 bytes). The Packet CRC (PKT CRC) contains the 16-bit CRC calculated on the contents of the Message ID, Response Code, Data ID, and the Data fields.

The End-of-Packet (EOP) character is an optional transmission of a BREAK condition (negative signal for 10 bit-times) transmitted at the message packet baud rate.

The Packet Address Fields

Every message packet in a CyberNet network includes 11-bytes which describe the complete network routing information. There are four subfields which comprise the Packet Address: the Destination ID, the Group ID, the Source ID, and a CRC calculated on the ID fields. The Destination and Source ID fields are four bytes each- The Destination and Group ID fields determine to whom the message is addressed. The Source ID field indicates the return address of the packet,. so that network nodes will know whom to respond to. And the CRC field validates the integrity of the packet address to prevent misrouting and reduce error responses.

Preferred Embodiment of the Destination and Source ID Fields

The Destination and Source ID fields may be represented as eight hexadecimal digits. The most significant four digits (two bytes) specify the System Domain Number, or more simply, the Domain, and the least significant four digits specify the Node Number. This is described in more detail below.

Digits 5–8: Indicate the System Domain Number. Range is 0001–FFFF, thus there can be 65 K System Domains operating on the same communications channel. The digits are designated with Digit 8 being the most significant.

Digits 1–4: Indicate the Node ID. Range is 0001–EEEE, allowing for over 32 K nodes per Domain. These digits determine the node the packet originated from and the node(s) it is addressed to.

Destination ID

The Destination ID field contains the four-byte identification of the unit(s) the message is intended for. In the preferred embodiment of the protocol, this field may contain wildcard characters in the Node ID digits (digits 1–4). If implemented, the wildcard character, specified as a hexadecimal value of "F" (decimal 15) in any digit, causes all units on the communications channel with Unit ID's matching the remaining digits to accept the message.

Group ID Field

In addition to broadcasting messages to units by transmitting wildcard characters in the Destination ID field, messages can be addressed to predefined system groups. The Group ID field contains a single byte that represents the group number being addressed. CyberNet nodes may be assigned and programmed with one or more Group Numbers, which are compared to the Group ID of the message packet, in conjunction with the Destination ID field. A Group ID of "0" (00H) signifies no group is being addressed.

In the preferred embodiment, the Group ID field is used in conjunction with the Destination ID field, and any wildcard characters it may contain, to describe the subset of nodes being addressed. Network nodes use the logical AND function on the results of the pattern matching on both of these fields to determine if they are being addressed.

Source ID

The Source ID field contains the four-byte binary Unit Identifier of the device transmitting the message. This field can not contain wildcard characters, it must explicitly identify the source of the message.

ID CRC

The ID field CRC is a 16-bit CRC calculated on the data in the Destination ID field and the Source ID field. This CRC serves to validate that the packet is received with the correct addressing. For most systems, once a node has been installed and configured in the network, it is likely that its Destination ID will not change. Therefore, this value may be stored in non-volatile memory with the Source and Destination ID's, or it may be calculated and transmitted with each message. The same CRC calculation is used on this field as is used on the entire message packet. If the ID CRC does not correspond with the data received in the ID fields, the entire message packet is to be ignored and no response packet will be generated. Refer to the section on the packet CRC for specific details on the algorithm used.

Message ID

Figure 3:
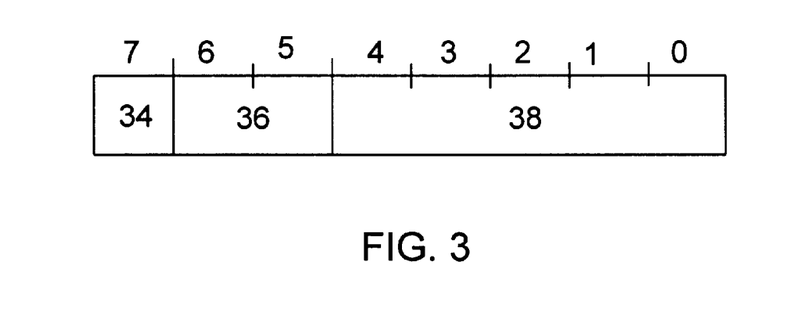
FIG. 3 is an illustration of the Message ID Field.

The Message ID field contains three sub-fields which are used to identify the particular message packet: the Message Type, the Message Data Flag, and the Packet Copy Number. The Message ID field of a response packet must match the Message ID of the originating packet. The Message ID Field consists of a Data Flag 34 at bit 7, a Copy Number 36 at bits 6 and 5, and a Message Type 38 at bits 4 through 0, as shown in FIG. 3.

The preferred embodiment of the Message Type is contained in bits 0–4 of the Message ID field data, with the following types defined to date:

0: In-Service Message
1: Alarm Message
2: Security Authorization Message
3: Service Status Message
4: Data Request Message
5: Data Packet Message
15: File Transfer Mode The Packet Copy Number is contained in bits 5 and 6 of the Message ID field data. These bits indicate how many times the message packet has been repeated. A message packet may be repeated for a variety of reasons, most commonly due to a negative acknowledgment in the response packet, or no response packet being received at all. A message packet may be issued a maximum of three times before an application error is generated.

The Message Data Flag is represented by bit 7 of the Message ID field. When this flag is set, it signifies that the message contains the Data fields. When reset, no data fields are included in the message packet.

Response Code

This byte field contains the response information for the message. In an originating message, this field contains information to the destination unit as to the proper response the sender expects to complete the message transaction. In the response message, this field contains the status of the message from the destination unit's point of view.

Preferred Embodiment of the Response Code

Bit 7 is the Message Response Flag (MRF), which when set, indicates that the message packet is a response to a previous message. If the MRF is 0, indicating an initial message, the remaining bits contain a code for the type of response the sender requires to the message by the receiver (s) If the M is 1, the remaining bits indicate the status of the initial message as received by the destination unit.

The following table lists the expected responses and the codes that pertain to them.

Code Response Request
00 No Acknowledgment Required
01 Reply only on Error
02 Acknowledge Receipt of Message
03 Acknowledge After Delay
04 Acknowledge Immediate Execution
05 Acknowledge Delayed Execution
06 Respond with Requested Data Only
07 Respond after Delay with Data
Code Response
80 Invalid Message (node did not understand message)
81 Negative Acknowledge (CRC error)
82 Acknowledged Receipt
83 Acknowledged Receipt of Prior Message
84 Acknowledged Execution
85 Acknowledged Prior Requested Execution
86 Responding with Data
87 Responding with Prior Requested Data
88 Acknowledged Receipt of Message but Failed Execution
89 Acknowledged Receipt, but Data is Out-of-Range
8A Acknowledged Receipt, but Busy
8B Acknowledged Receipt, but I have Alarm(s) and cannot execute
8C File Transfer Mode Resend Single Packet
8D File Transfer Mode Restart at Packet Number "NN"
8E File Transfer Mode Abort Transmission Data Index The two-byte Data Index field contains a 16-bit data-identifier known to both the sender and receiver of the message. This identifier may be used as a filename index, variable name pointer, or an index to a data structure in the destination device. Command functions can also be implemented using the Data Index field and/or the Data field, to convey the command parameters.

In the preferred embodiment, the Data Index field corresponds to an assigned index or table pointer to specific data set in the devices' agreed-upon data map (or structure). If the message does not transfer data, this field will be empty. The data pointer references a memory or variable which may be arbitrarily assigned. This allows multiple variables to be concatenated and transmitted as a string by referencing the pointer of the starting variable and requesting a specified number of bytes. Using this method also allows rewritable program memory to be updated, creating a dynamic system where new features or functions can be added to an existing system.

Data Payload Fields

Data Length

This field contains the number of data bytes to be transferred in the Data Field of the packet. Since this is an 8-bit number, a maximum of 255 bytes may be transmitted, represented by inserting (0×FF) in this field. If no data is being transferred in the message packet (Message Data Flag=0), this field will be empty. This field may be increased to two-bytes (16-bits) for embodiments where larger data packets are required, however, from a practical perspective. It is recommended to limit the packet data length to less than 4 KB.

Data

This variable-length field contains the actual data being transferred. The number of data bytes in this field must match the number contained in the previous field "Number of Data Bytes". All data is assumed to be in binary form. If no data is to be transferred in the message packet, as indicated when the Message Data Flag is cleared (0), then this field will be empty.

Packet CRC

This is a 16-bit CRC calculated on the message packet, excluding the Sync Field and Packet Address fields. The CRC (Cyclic Redundancy Check) is used to verify the integrity of the message packet by the receiver. The algorithm used is identical to that for the Packet Address fields, and conforms to the standard CCITT $x^{16}+x^{12}+x^5+1$ polynomial. The polynomial is calculated with a seed word of all ones, and transmitted MSB first.

End of Packet Signal

The preferred embodiment of the protocol implements an optional asynchronous break signal (negative, or "0" bit signaling for 10 bit times) to terminate the packet This signaling method provides hardware-detectable framing for both the start and end of each packet on the network.

Preferred Embodiment of Message Transactions

There are an unlimited number of transaction sequences that are possible in a CyberNet system due to the flexibility of the message packets. In general, all packets should require some response by the destination device to verify their reception. Efficiency is paramount however, and when possible the expected response should include the data, if any was requested.

Each device should respond to any packet requiring an immediate response within one second to acknowledge receipt. The original sending device should wait at least two seconds after transmission of the packet is complete before assuming the destination did not respond. If a device is not prepared to send the requested data within the one second window, it must transmit a response packet without the data and Faith an appropriate response code. Once the data is available for transmission, the device should transmit it in a data packet requiring acknowledgment of receipt by the recipient (the original requester).

If a unit receives a packet with an error in any of the Packet Address fields, the unit must ignore the entire packet, no response must be made. If a unit receives a packet addressed to itself with a valid Packet Address, but a subsequent packet CRC error, the receiving unit should respond to the sender with a negative acknowledgment. If it is a group message, the unit should respond after the bus becomes idle. The negative acknowledgment response should be aborted if the packet is received correctly prior to sending the response.

Message Compatibility for Network Devices

All devices on the network must respond to the minimum three message types, the Data packet, the Request Data packet, and the In-Service Message; with the appropriate message responses. These are considered the minimum messages required for a device to operate in the networks.

Device Installation

When a new device is installed in the system, it must notify the Master Station(s) on its branch of the network of its presence and request network configuration information. The node at installation is not aware of the network ID of other nodes, and thus broadcasts a special In-Service message with the Destination ID field zeroed. In order to distinguish among several units that may be installed simultaneously, the unit inserts its factory-programmed Product Number into the Source ID field. The message packet is identified as an In-Service message and no further information is required. Any additional information needed by a master station to configure the nodes can be requested via normal packet transfers. The Network Master Station will respond by writing the node's Unit ID field with the correct network ID to be used in all future messages. The Master Station also writes any other configuration information required for the node to function, as determined by its Product Number.

Alarm Message

An Alarm message is very similar to the Data Packet message, but it is given a different Message Type code to distinguish the urgency of the data. Alarm messages may be given greater priority in the network.

Data Request Messages

Request Data messages are the method whereby a device can request, or read, data from another network device. This message type is critical to the operation of the network.

Data Packet Messages

Data Packet Messages are essential to the operation of the network. They are used to transfer data to another device whether or not the device requested the data be sent. This can occur when any network device needs to notify another device of new data, or in response to a Request Data message.

Security Message

The Security message is used to provide validation and authentication of a requested command or data transfer that is protected. Implementation details may vary with the application.

Service Status Message

This message is used to indicate that the device will be off-line until further notice. This can be used by a device to notify other devices of a condition which prevents it from responding to messages on the network, or can be implemented to force a device to disable itself from the network if it is adversely affecting the operation of the network.

Group Messages

Group messaging is compatible with all the basic message types, the most notable differences are that the destination ID includes one or more wildcard characters ("F"), and that the responses must be managed to prevent the entire group from contending for the network simultaneously. This latter concern is handled through the use of the Delayed Acknowledgment Response codes, or if data is being requested, by determining who did not respond.

File Transfer Mode

The CyberNet Protocol supports a block transfer mode suitable for transmitting binary files, or when the data to be transferred exceeds the limits of a single packet In this mode, the requesting node transmits a "File Transfer" message tape packet to the node it desires the block of data from. The "Data" field specifies the parameters of the data or file requested in null-delimited ASCII strings, including the reference name for the file, the desired transmission baud rate, and a character to indicate the file operation to be performed (A=Append, N=New, C=Copy/Overwrite). The "Data Index" field is set to "00H", and the "Data Length" field containing the number of bytes in the Data field, as it normally does.

The requested node transmits a response data packet with the Message Type corresponding to the original message, and the Data field containing the null-delimited ASCII descriptors of the data or file to be transmitted, including the reference name, total file length in bytes, transmission baud rate, and the file operation character.

The requested node then begins transfer of the file, in 256-byte blocks, as data messages with the Message Type indicating the File Transfer Mode. The "Data Index" field contains the block number in hexadecimal form, for a maximum of 65,535 blocks (16.7 MB). The block number field initially contains the number of blocks to be transferred, minus 1, and decrements with each block sent until the file transfer is completed. Thus, this field always contains the number of blocks remaining to be sent. The final block to be transmitted is indicated when the block number to zero. Since the final block may contain less than 256 bytes, the "Data Length" field contains the actual number of bytes transferred in the block.

During the transfer, the node which is receiving the data is not required to acknowledge each packet. If an error is detected, or a packet is transmitted out of sequence and cannot be inserted, the receiving node can interrupt the transfer by sending a "File Transfer Mode" message response packet with the "Data" field containing only the file reference name and the "Data Index" field containing the block number to resend or restart at. The receiving node may also abort the file transfer by sending the appropriate response code. The transmitting node may also abort the file transfer by transmitting a non-zero FTM packet number as the "Data Index" and transmitting an empty data field, with a "Data Length" of "00H".

Description and Operation—Alternative Embodiments

It is anticipated that alternative embodiments will be obvious to one skilled in the art, and alternative embodiments are envisioned by the inventor. Such alternatives may include increasing the number of bytes in particular fields, or the addition of descriptive fields to the protocol. For example, increasing the Data Length field to two-bytes provides larger packet sizes for networks requiring greater data payloads, without significantly detracting from the benefits of the protocol. Also, the addition of a "Port Number" field to the Packet ID field structures provides the means for identifying a particular application within the destination node for the message packet to be directed to, which may or may not correspond to a particular hardware device internal or external to the destination node. These and similar alterations of the basic invention are both anticipated by and included in the present invention.

Conclusion

Thus, an improved network protocol is described which provides significant improvements in performance, reliability, and cost-effectiveness and which supports varied applications requirements through a common communication structure.

What is claimed is:

1. For use with a network used by a plurality of devices, said plurality of devices sending and receiving messages over said network, each device of said plurality of devices having a data rate and a priority level, an operating protocol for a device which desires to transmit data over said network, said operating protocol comprising:

(a) monitoring said network for activity for a guardband time, said guardband time being a function of at least one of the slowest data rate for said network and the priority level of said device which desires to transmit;

(b) if there is no activity during said guardband time, then transmitting a priority character at said slowest data rate and monitoring said network to detect simultaneous transmission by another of said devices, said priority character representing the priority level of said device which desires to transmit; and (c) if there is a said simultaneous transmission by a said device having a higher priority level than the priority level of said device which desires to transmit, then aborting said transmission and delaying for a period of time determined by at least one of said slowest data rate, said priority level of said device which desires to transmit, and the number of transmissions which have been aborted since a predetermined event.

2. The operating protocol of claim 1 wherein said devices comprise a first device and second devices, and wherein said operating protocol for said first device further comprises:

receiving a message from a transmitting device, said message requiring a response;

within a predetermined period of time after receiving said message, beginning to transmit a predetermined sequence;

continuously transmitting said predetermined sequence until said first device has prepared said response; and sending said response as a message to said transmitting device.

3. The operating protocol of claim 2 wherein said first device transmits said predetermined sequence by continuously transmitting break characters.

4. For use with a network used by a plurality of devices, said plurality of devices sending and receiving messages over said network, each device of said plurality of devices having a data rate and a priority level, an operating protocol for a device which desires to transmit over said network, said operating protocol comprising:

(a) monitoring said network for activity for a guardband time, said guardband time being a function of at least one of the slowest data rate for said network and the priority level of said device which desires to transmit;

(b) if there is no activity during said guardband time then transmitting a message over said network and monitoring said network to detect simultaneous transmission by another of said devices; and (c) if there is a said simultaneous transmission by a said device having a higher priority level than the priority level of said device which desires to transmit, then aborting said transmission and delaying for a period of time determined by at least one of said slowest data rate, said priority level of said device which desires to transmit, and the number of transmissions which have been aborted since a predetermined event.

5. The operating protocol of claim 4 wherein said guardband time is a function of both said slowest data rate and said priority level.

6. The operating protocol of claim 4 wherein step (b) comprises transmitting a priority character at said slowest data rate and monitoring said network to detect simultaneous transmission by another of said devices.

7. The operating protocol of claim 6 wherein said priority character represents the priority level of said device which desires to transmit.

8. The operating protocol of claim 4 wherein step (b) comprises transmitting a priority character at said slowest data rate, said priority character representing the priority level of said device which desires to transmit.

9. The operating protocol of claim 7 wherein said period of time is at least determined by said number of said transmissions which have been aborted since said predetermined event and wherein said predetermined event is a previous transmission which was not aborted.

10. The operating protocol of claim 7 wherein said period of time is at least determined by said number of said transmissions which have been aborted since said predetermined event and wherein said predetermined event is a previous guardband time during which there was no activity.

11. The operating protocol of claim 7 wherein said period of time for delaying is a function of at least two of said slowest data rate, said priority level of said device which desires to transmit, and said number of said transmissions which have been aborted.

12. The operating protocol of claim 7 wherein said period of time for delaying is a function of all of said slowest data rate, said priority level of said device which desires to transmit, and said number of said transmissions which have been aborted.

13. The operating protocol of claim 7 and further comprising:

(d) if there is no said activity during said guardband time and there is no said simultaneous transmission by a device having a higher priority level, then transmitting a message, said message comprising a packet address, a field identifying a type of message transmitted, and a field identifying a type of response expected from a recipient device as a result of said message, said packet address comprising an identifier for said recipient device and an identifier for said device which wishes to transmit.

14. The operating protocol of claim 4 wherein said devices comprise a first device and second devices, and wherein said operating protocol for said first device further comprises:

receiving a message from a transmitting device, said message requiring a response;

within a predetermined period of time after receiving said message, beginning to transmit a predetermined sequence;

continuously transmitting said predetermined sequence until said first device has prepared said response; and sending said response as a message to said transmitting device.

15. The operating protocol of claim 14 wherein said first device transmits said predetermined sequence by continuously transmitting break characters.

* * * * *

UNITED STATES PATENT AND TRADEMARK OFFICE
CERTIFICATE OF CORRECTION

PATENT NO. : 6,002,669
DATED : December 14, 1999
INVENTOR(S) : Darryl C. White

It is certified that error appears in the above-identified patent and that said Letters Patent is hereby corrected as shown below:

Title page, insert the following: item [60] Provisional application No. 60/014,071 filed, March 26, 1996.

Column 1, under the title , insert -- CROSS REFERENCE TO RELATED APPLICATION

Reference is made to and Priority claimed from U.S. Provisional application Ser. No. 60/014,071, filed March 26, 1996.

Signed and Sealed this

Seventh Day of March, 2000

Attest:

Attesting Officer

Q. TODD DICKINSON

Commissioner of Patents and Trademarks